June 5, 1928.
G. I. LEONARD
1,672,571
COMPRESSOR
Filed March 27, 1926
4 Sheets-Sheet 1
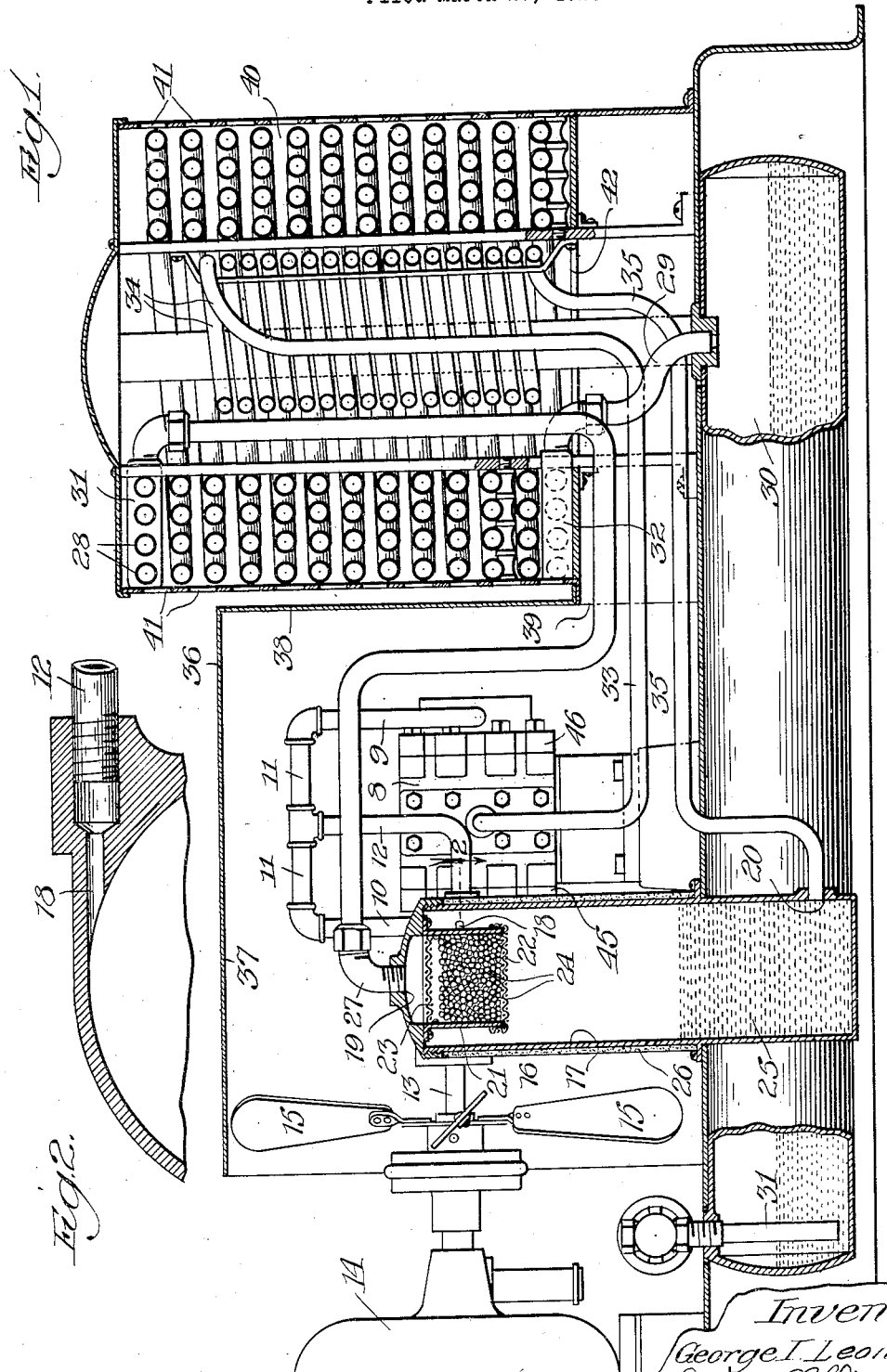

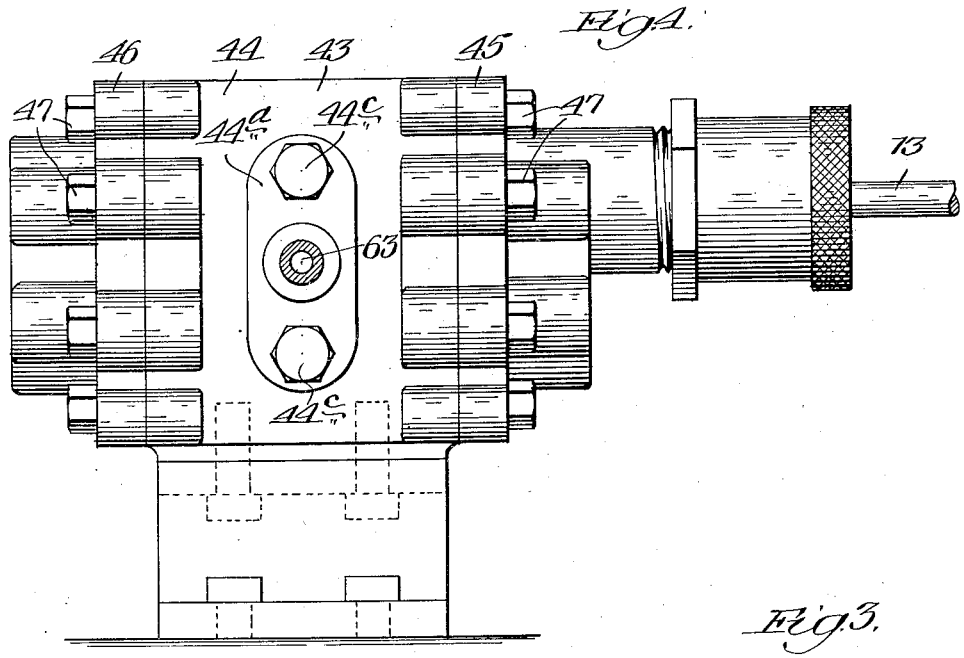
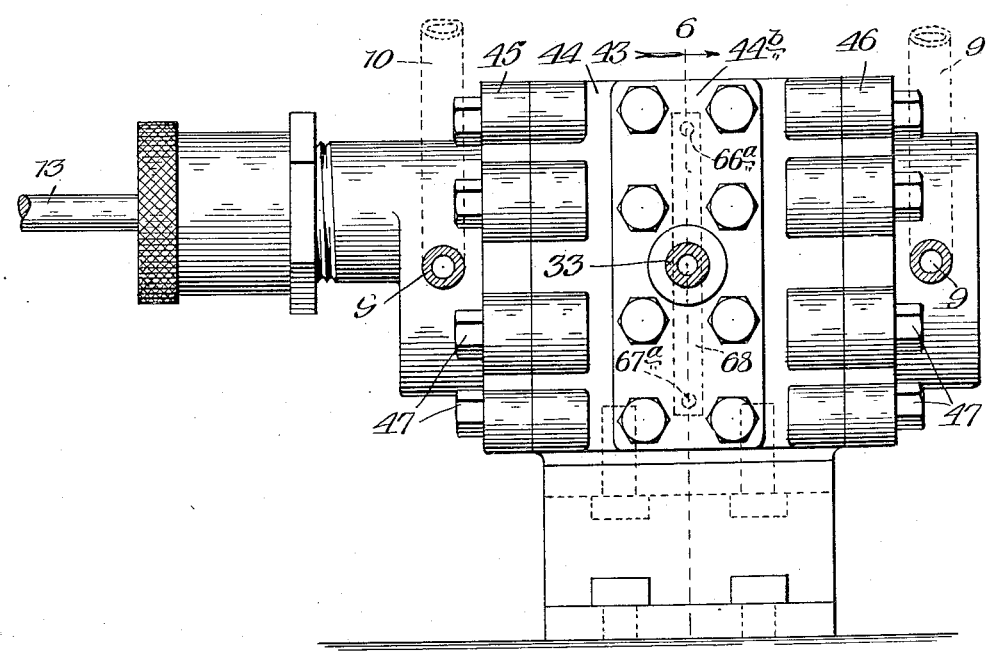

June 5, 1928.  
G. I. LEONARD  
COMPRESSOR  
Filed March 27, 1926  
1,672,571  
4 Sheets-Sheet 3
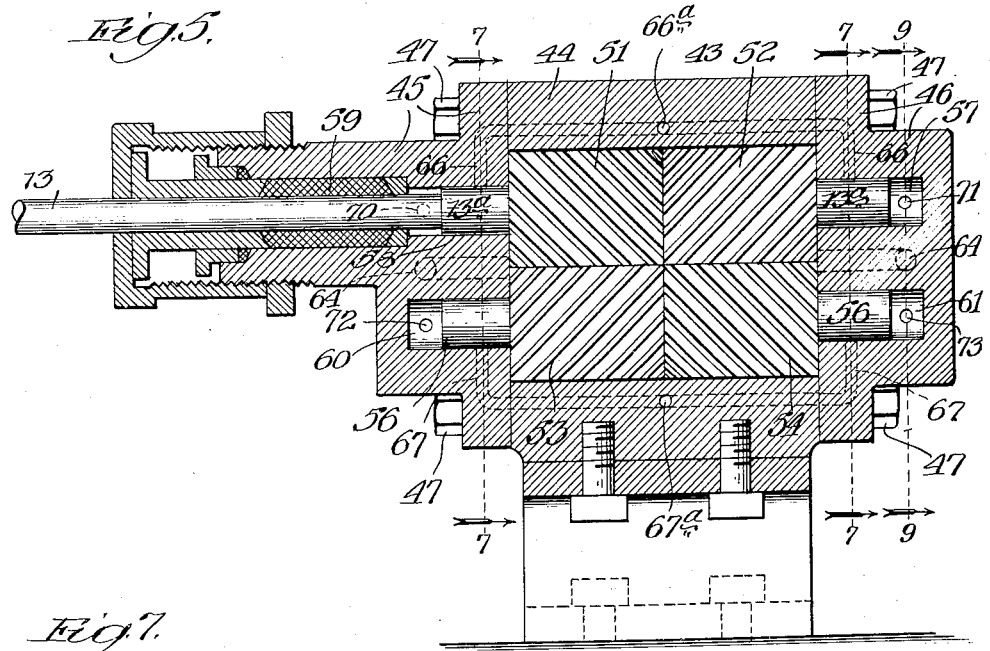
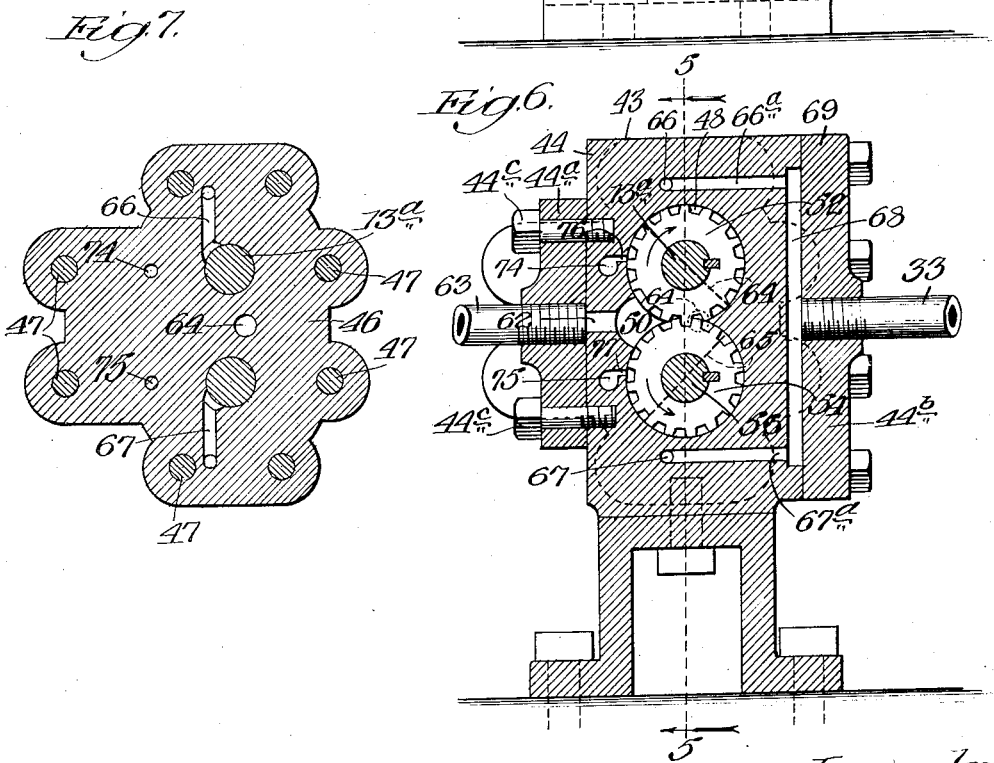
Inventor:
George I. Leonard,

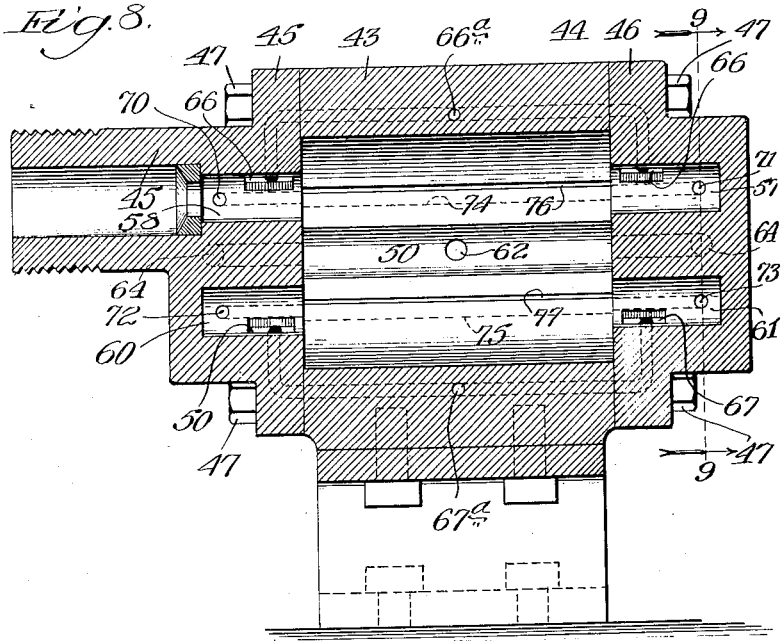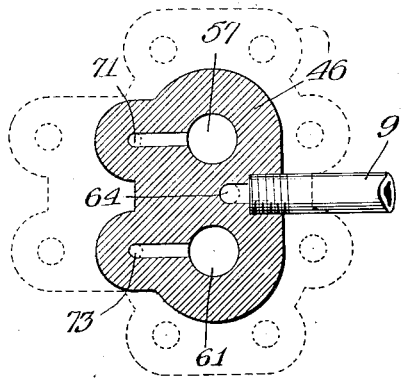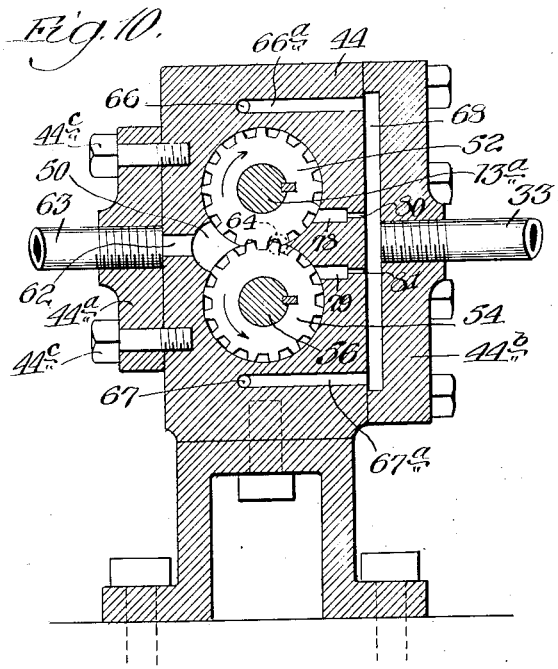

Patented June 5, 1928.

1,672,571

UNITED STATES PATENT OFFICE.

GEORGE I. LEONARD, OF CHICAGO, ILLINOIS, ASSIGNOR TO LEONARD PUMP & MOTOR CO., OF CHICAGO, ILLINOIS, A CORPORATION OF MAINE.

COMPRESSOR.

Application filed March 27, 1926. Serial No. 97,961.

My invention relates generally to compressors and more particularly, though not to the exclusion of its use in a different situation, to compressors used as elements of refrigerating systems for compressing, to the desired degree, the refrigerant employed, as, for example, sulphur dioxide. Furthermore, the invention has to do with compressors wherein the fluid compressed therein is compressed to a relatively high degree, and more especially to compressors of the intermeshing gear type.

As such compressors have heretofore been constructed the bearings in which the shafts of the gears are journaled become unduly worn in a comparatively short length of time, due to highly unbalanced pressure exerted against them and occasioned by reason of the fact that as the gas becomes compressed between the gears great pressure is exerted against the latter by reason of the gas confined between them and the gear case and which occurs throughout a portion only of the revolution of the gears.

My primary objects are to provide a construction of compressor wherein unbalanced pressure of the gear elements against the bearings therefor and which produces the objectionable wear referred to, is greatly reduced, if not practically eliminated, to the end that the objections resulting from such wear shall be overcome, whereby expense is saved, the structure is rendered operable by less power and greater compression of the gas may be effected; to provide for the supplying of lubricant to the bearings of the gears to the end that the bearings shall be better lubricated and, preferably, more effective sealing of the gears against loss of compressed gas, is effected; to provide for the more uniform sealing of the gears; and other objects as will be manifest from the following description.

Referring to the accompanying drawings: Figure 1 is a view in elevation, partly sectional, of a portion of a refrigerating apparatus employing my invention. Figure 2 is an enlarged broken section taken at the line 2 on Fig. 1 and viewed in the direction of the arrow. Figure 3 is a view in side elevation of the compressor of the preceding figures. Figure 4 is a similar view viewing the compressor from the opposite side. Figure 5 is a vertical longituidnal section of the compressor, the section being taken at the line 5 on Fig. 6 and viewed in the direction of the arrow. Figure 6 is a section taken at the line 6 on Fig. 3 and viewed in the direction of the arrow. Figure 7 is a section taken at either line 7—7 on Fig. 5 and viewed in the direction of the arrows. Figure 8 is a view like Fig. 5 of the gear-casing, the gears being removed. Figure 9 is a section taken at the lines 9—9 on Figs. 5 and 8 and viewed in the direction of the arrows; and Figure 10, a view like Fig. 6 of a modification of the structure therein shown.

Referring more particularly to Fig. 1 which shows a refrigerating system involving, as an element thereof, my improved compressor, the system referred to comprises the compressor, or pump, 8, which is illustrated in detail in Figs. 3 to 9 inclusive of the accompanying drawings and is hereinafter described, this compressor being provided for compressing the refrigerant employed and which may be, by way of example, sulphur dioxide. The pipes represented at 9 and 10, which connect with the compressed gas outlets of the pump and hereinafter referred to, are connected with a pipe 11 from which leads the pipe 12, whereby the gas compressed in the compressor 8 and supplied thereto from the refrigerator coil (not shown) and after being compressed in the compressor, is discharged through the pipe 12. The compressor is driven through the medium of the shaft 13 shown as actuated from a motor 14, this shaft being equipped with an air-circulating fan 15. The apparatus also involves an oil and gas separator for separating from the gas, compressed by the compressor 8 and discharged through the pipe 12, the oil which becomes intermixed therewith and which is supplied to the compressor as hereinafter explained, this separator being represented at 16. The separator shown forms the subject of another application for United States patent filed by me, and therefore a general description only of this separator will suffice. As shown, it is formed of a tank 17 into the upper end of which the pipe 12 opens through a tangentially-disposed passage 18. The top of the tank 17 contains an outlet 19 for the gas, there being an outlet 20 for the oil separated from the gas this outlet being located adjacent the bottom of the tank. The tank 17 is equipped with a depending hollow member 21 open at its opposite ends and supported from the top plate of the tank, the tubular member 21 being considerably smaller in diameter than the internal diameter of the tank 17 and centrally-disposed therein. The member 21 is provided with an interstitial bottom 22 which may be in the form of a wire mesh, a partition of similar material being preferably provided at the upper end of the member 21, as represented at 23. The space provided within the member 21 contains a mass of bodies, represented at 24, of such shape that interstices are provided between the adjacent ones of these bodies and of such dimensions that the oil which may pass upwardly therethrough with the gas discharged into the tank 17 through the pipe 12, will run down the surfaces of these bodies and clogging of the interstices with oil which would prevent flow of the gas upwardly therethrough, is avoided.

By way of example, the bodies 24 may be spheres of approximately three-eighths of an inch in diameter. It may be here stated that the compressed gas discharging into the tank 17 through the pipe 12, and which would contain oil introduced into the compressor as hereinafter stated, is caused to be subjected to separation by centrifugal action due to the fact that it is introduced into the tank 17 through the tangentially-disposed passage 18, this resulting in the separation from the gas of at least the greater portion of the oil, which runs down the inner side of the tank 17 into the bath of oil therein represented at 25. The gas from which oil has been freed, as stated, thence flows upwardly through the interstices afforded between the bodies 24 and into contact with the latter and discharges through the outlet 19, the oil which may be contained in the gas, in passing upwardly through the mass referred to, becoming deposited upon the surfaces of the bodies 24 which, as will be readily understood, are very extensive in area. The upper portion of the tank 17 is shown as sheathed by a covering 26 of heat-non-conducting material, as, for example, asbestos, to reduce, to as great a degree as possible, radiation of heat from the contents of the tank 17, to the end that the bath 25 of oil is maintained in heated condition with the result that any gas which may be contained therein and of a highly volatile character, may rise therefrom and discharge through the outlet 19. The outlet 19 communicates with a pipe 27 which leads into the upper end of a condenser coil 28, the other, discharge, end of which opens into a pipe 29 discharging into a receptacle 30 for the condensed refrigerant and from which the refrigerant for supplying the refrigerator coil passes through a pipe 31 opening into this receptacle. The condenser coil shown is formed of four separate coils of pipe the coils being of different diameters and arranged concentrically, the inlet ends of the coils opening into a header 31 with which the pipe 27 communicates, and the opposite discharge ends of these pipes opening into a header 32 from which the pipe 29 leads.

The compressor 8, in accordance with the particular showing in the drawings, is of such construction that the gears and the bearings therefor are supplied with lubricating and sealing fluid which, in the operation of the compressor, becomes mixed with the gas compressed therein and which is separated therefrom in the separator 16. The lubricating and sealing oil is supplied to the compressor through a pipe 33 which opens at its outlet end into the compressor as hereinafter explained and at its opposite end is connected with the upper end of a pipe coil 34 located within the confines of the condenser coil 28, the lower end of the coil 34 being connected with the pipe 35 which communicates with the inlet 20 of the tank 17.

The various parts described, except the motor and tank 30, are disposed within a housing represented generally at 36. One end of this housing is represented at 37 and in this portion the compressor, separator and fan are located, as shown, the end of the housing section 37, adjacent the motor 14, being open, as shown. The opposite end of this housing section is provided with an end wall 38 containing, adjacent its lower edge, an opening 39 through which the housing section 37 communicates with a vertically-disposed housing section 40 in which the condenser coil 28 and the oil coil 34 are located. The side wall of the housing section 40 is perforated at intervals throughout its circumference, as represented at 41, and its bottom wall contains an opening, represented at 42, which communicates with the opening 39. The fan 15 operates to cause air to be drawn in to the housing section 40 through the openings 41 and thence passed downwardly through its open bottom and the opening 39 into the housing section 37 from which it discharges at the left hand end thereof in Fig. 1, the air, in thus passing through the housing serving to cool the coils 31 and 34, the compressor 8 and the piping located within the housing.

Referring now more particularly to the particular, illustrated construction of compressor, it comprises a casing 43 shown as formed of the central section 44, the end sections 45 and 46 bolted together as through the medium of the bolts 47 and plate sections 44$^a$ and 44$^b$ in which latter the pipe 33 is secured. The section 44 of the casing contains cylindrical bores 48 and 49 extending in parallel intersecting relation as shown in Figs. 5 and 6, a portion of the wall of these bores adjacent their intersection being cut away, as represented at 50, to present a space extending substantially parallel with the bores 48 and 49. In the particular construction shown the rotary elements of the compressor are in the form of intermeshing gears of the herringbone type. Four of these gears are provided, these being represented at 51, 52, 53 and 54. The gears 51 and 52 are mounted in alining position on an enlargement 13ª of the shaft 13 and are located in the bore 48, the teeth of these gears extending in opposite directions as shown in Fig. 5. The gears 53 and 54 are mounted in alinement on a shaft 56, these gears being located within the bore 49 and likewise arranged with their teeth extending in opposite directions as shown in Fig. 5. The gear 51 cooperates with the gear 53, and the gear 52 with the gear 54, the teeth of these pairs of gears intermeshing as shown in the figure last referred to. One end of the shaft-enlargement 13ª is journaled in a socket 57 in the end section 46, the opposite end of this shaft being journaled in an opening 58 in the end plate 45 and extending through a stuffing box 59. The ends of the shaft 56 are journaled in sockets 60 and 61 in the end sections 45 and 46, respectively. The casing section 44 contains a passage 62 which opens at one end into the space 50 and at its opposite end into a pipe 63 which leads from the source of gas to be compressed which, in the particular system shown, is the refrigerator coil, the pipe 63 being supported in the plate section 44ª secured to the casing-section 44 by screws 44ᶜ. The gear arrangement of the compressor is such, as shown, that as the gears are rotated in the direction of the respective arrows in Fig. 6, the gas which enters between the gears through the space 50 and is carried by the gears part way around the walls of the bores in which they are located, becomes compressed between the intermeshing teeth and is permitted to escape therefrom, preferably substantially at the points of final inter-mesh of the gears, through outlets at the ends of the gear casing which communicate with the pipes 9 and 10, one of these outlets being shown at 64, these outlets being similarly arranged at opposite ends of the casing. It will be understood from the foregoing that in the compressing of the gas by the inter-meshing gears, the latter are subjected to relatively high pressure by the gas confined between them and the walls of the bores in which the gears operate, thereby exerting great lateral pressure against the bearings in which the shafts of the gears are journaled, it having been discovered that the force referred to is directed along lines substantially conforming to the dotted lines 64 and 65 in Fig. 6. In accordance with one phase of my invention I purpose to practically balance the forces referred to, this being accomplished in the particular construction shown by subjecting the ends of the shafts carrying the gears, to lubricating oil under pressure, the oil being directed against the peripheries of these shafts at points diametrically opposed to the points at which the mean effective pressure, due to the compressing of the gas, occurs on the gears or, in other words, substantially diametrically opposed to the lines 64 and 65. In the particular construction shown the passages through which the lubricating oil is conducted to the ends of the shafts carrying the gears, are represented at 66 and 67, these passages being formed in the gear casing and opening through the bearings for the shaft at such angles, as shown in Fig. 7, as to cause the force exerted by the lubricating oil against the peripheries of the shafts, to substantially diametrically oppose the force set up between the gears and the gear casing by the gas undergoing compression, as hereinbefore explained. The passages 66 merge into a common passage 66ª and the passages 67 likewise merge into a common passage 67ª, the passages 66ª and 67ª opening into the upper and lower ends, respectively, of a passage 68 formed in a base of the gear-housing section 44, this passage being closed at one side by the plate 44ᵇ.

The ends of the shaft-enlargement 13ª and the shaft 56 extend short of the ends of the bearings in which they are journaled, as shown in Fig. 5, and thus pockets are formed between these parts with which passages 70, 71, 72 and 73 communicate, the passages 70 and 71 opening into a common passage 74 in the casing and the passages 72 and 73 into a common passage 75 in the casing, the passages 74 and 75 being shown as extending parallel with each other and with the bores in which the gears are located and terminating in restricted elongated slots 76 and 77, respectively, which open into the bores 48 and 49, respectively, at the sides thereof adjacent the space 50 and slightly above the axes of the gears as shown.

In the operation of the compressor lubricating and sealing oil is being constantly supplied thereto through the pipe 33 at a pressure substantially that of the gas compressed by the compressor. The cross-sectional areas of the passages 66, 66ª, 67, 67ª and 68 are such that the pressure of the oil in these passages is substantially that of the gas compressed by the compressor, and the cross-sectional area of the passages 66 and 67 where they open through the journal bearings is such, as shown more particularly in Figs. 7 and 8, that the pressure exerted by the gas being compressed and tending to spread the gears and casing, is substantially balanced by the pressure of the lubricating oil supplied to the shafts. The advantages arising from thus balancing the force exerted by the gas in being compressed will be manifest, certain of them being that the compressor may be operated with less power, wear of the parts is reduced to the minimum with consequent economy, and a high degree of compression may be effected. Furthermore, the supplying of the lubricating oil to the ends of the shaft, under pressure as stated, operates to insure the maximum lubrication of the shafts throughout their peripheries; and results in the working of the oil between the ends of the gears and the adjacent ends of the gear housing, thereby enhancing the oil sealing effect, and thus greatly augumenting the sealing effect produced by the introduction of oil into the bores 48 and 49 through the passages 68 and 70.

In the operation of the compressor the oil supplied to the shafts as stated flows along these shafts into the pockets therebeyond in the bearings from which it flows through the passages 70, 71, 72 and 73 to the pasasges 74 and 75 and thence from the latter, through the slots 76 and 77 into the bores 48 and 49 where it is taken up by the gears, the latter in rotating wiping off the oil as they revolve against it. The slots 76 and 77 by being of a length substantially equal to the length of the gears, thus serve to cause the oil, which performs a sealing function within the bores for the gears, to be uniformly distributed along the gears thereby causing the apparatus to function in a highly satisfactory manner. The provision of the various passages described and leading from the pockets beyond the shaft-extension 13ª and shaft 56 is such that no appreciable force is exerted by the oil against the face of the gears.

In the construction shown in Fig. 10, instead of utilizing the oil from the bearings for the sealing purpose and providing the passages 70 to 75 inclusive, the oil for sealing is taken from the supply as it enters the casing by providing the passages 78 and 79 which open into the bores 48 and 49, respectively, above and below the line of intersection of the upper and lower gears and practically coincident with the vertical center line of the gears, and open at their reduced portions 80 and 81 into the passage 68, the portions 80 and 81 being so restricted that while a sufficient supply of sealing oil is caused to exist at all times at the faces of the gears, no appreciable pressure is exerted by the oil against the gears.

While the compressor is shown as supplied with lubricating and sealing oil relatively remotely located from the compressor and piped to and from the latter, it will be understood that, if desired, the compressor may be immersed in the oil which is to be supplied thereto for the lubricating and sealing purposes. Furthermore, various other changes and modifications may be made in the construction shown without departing from the spirit of my invention.

What I claim as new and desire to secure by Letters Patents, is:

1. In a gas-compressor, the combination of its casing, rotatable compressing elements therein and comprising intermeshing portions, and means for directing fluid under pressure against said elements at points substantially diametrically opposed to the points at which the mean effective pressure, due to the compressing of the gas, occurs at said portions.

2. In a gas-compressor, the combination of its casing, rotatable compressing elements therein and comprising intermeshing portions, and means for directing fluid against said elements at points substantially diametrically opposed to the points at which the mean effective pressure, due to the compressing of the gas, occurs at said portions, and under such pressure that the pressure of the gas against the peripheries of the gears is substantially counterbalanced.

3. In a gas-compressor, the combination of its casing, rotatable compressing elements therein and comprising intermeshing portions, and means for directing fluid against said elements at points substantially diamertrically opposed to the points at which the mean effective pressure, due to the compressing of the gas, occurs at said portions, and under substantially the same pressure as the gas after being compressed by the compressor.

4. In a gas-compressor, the combination of its casing, rotatable compressing elements therein and comprising intermeshing herring-bone gears, said casing containing an inlet for the gas to be compressed and an outlet for the compressed gas, and fluid-conducting ports in said casing opening through the side walls of the bearings for said gears, at points substantially diametrically opposed to the points at which the mean effective pressure, due to the compressing of the gas, occurs at the gears.

5. In a gas-compressor, the combination of its casing, rotatable compressing elements therein and comprising intermeshing herring-bone gears arranged to discharge the gas compressed therebetween, through the end of said gears said casing containing an inlet for the gas to be compressed and an outlet for the compressed gas, and fluid-conducting ports in said casing opening through the side walls of the bearings for said gears, at points substantially diametrically opposed to the points at which the mean effective pressure, due to the compressing of the gas, occurs at the gears.

6. In a gas-compressor, the combination of its casing, rotatable compressing elements therein comprising intermeshing portions beyond which said elements are of reduced diameter and at which they are journaled in said casing, and means for directing fluid under pressure against the journaling portions of said elements at points substantially diametrically opposed to the points at which the mean effective pressure, due to the compressing of the gas, occurs at said intermeshing portions.

7. In a gas-compressor, the combination of a casing, rotatable compressing elements therein and comprising intermeshing portions, said casing containing a passage extending lengthwise of said elements for receiving sealing fluid, said passage having an outlet in the form of an elongated slot in its side wall which opens into the bore in which one of said elements is located.

8. In a gas-compressor, the combination of a casing and rotatable compressing elements therein in the form of intermeshing gears, said casing containing passages extending lengthwise of said elements for receiving sealing fluid, said passages containing outlets in the form of elongated slots in their side walls which open, respectively, into the bores in which said elements are located.

9. In a gas-compressor, the combination of a casing and rotatable compressing elements therein in the form of intermeshing gears, the wall of the bore in which one of said elements is located containing a slot through which lubricating fluid enters said bore, said slot extending substantially the entire length of said bore.

10. In a gas-compressor, the combination of a casing and rotatable compressing elements therein comprising intermeshing portions, said casing being provided with bearings for said elements the latter reaching short of the inner ends of said bearings whereby pockets are formed, said casing containing passages through which lubricating and sealing fluid is introduced into said bearings, and also containing other passages in communication with said pockets for conducting the fluid therefrom to the intermeshing portions of said elements for performing the sealing function.

11. In a gas-compressor, the combination of a casing, rotatable compressing elements therein and comprising intermeshing portions, and means for conducting lubricating and sealing fluid to the bearings of said elements, the structure containing a passage opening into said bearings and through which the fluid flows, after flowing through said bearings, to the intermeshing portions of said elements to serve as a sealing medium therefor.

12. In a gas-compressor, the combination of a casing, rotatable compressing elements therein and comprising intermeshing portions, means for conducting lubricating and sealing fluid to the bearings of said elements, the structure containing a passage opening into said bearings and through which the fluid flows, after flowing through said bearings, to the intermeshing portions of said elements to serve as a sealing medium therefor, and means operating to induce such flow of said fluid.

13. In a gas-compressor, the combination of a casing, rotatable compressing elements therein and comprising intermeshing portions, and endless course for the circulation therethrough of lubricating and sealing fluid in which course the bearings of said elements and the interior of said casing are interposed, and means for producing a flow of the fluid first to said bearings to lubricate them and thereafter into said casing and between said intermeshing portions to serve as a sealing medium therefor.

GEORGE I. LEONARD.